(12) United States Patent
Balasubramanian et al.

(10) Patent No.: US 11,928,468 B2
(45) Date of Patent: Mar. 12, 2024

(54) SYSTEMS AND METHODS FOR IMPROVED MAPPING OF COMPUTATIONAL LOOPS ON RECONFIGURABLE ARCHITECTURES

(71) Applicants: Mahesh Balasubramanian, Tempe, AZ (US); Aviral Shrivastava, Phoenix, AZ (US)

(72) Inventors: Mahesh Balasubramanian, Tempe, AZ (US); Aviral Shrivastava, Phoenix, AZ (US)

(73) Assignee: ARIZONA BOARD OF REGENTS ON BEHALF OF ARIZONA STATE UNIVERSITY, Tempe, AZ (US)

( * ) Notice: Subject to any disclaimer, the term of this patent is extended or adjusted under 35 U.S.C. 154(b) by 206 days.

(21) Appl. No.: 17/533,663

(22) Filed: Nov. 23, 2021

(65) Prior Publication Data

US 2022/0164189 A1    May 26, 2022

Related U.S. Application Data

(60) Provisional application No. 63/117,684, filed on Nov. 24, 2020.

(51) Int. Cl.
*G06F 9/30*    (2018.01)
*G06F 9/445*    (2018.01)

(52) U.S. Cl.
CPC ........ *G06F 9/30065* (2013.01); *G06F 9/3001* (2013.01); *G06F 9/44505* (2013.01)

(58) Field of Classification Search
CPC . G06F 9/30065; G06F 9/3001; G06F 9/44505
See application file for complete search history.

(56) References Cited

U.S. PATENT DOCUMENTS

| 2015/0149747 | A1* | 5/2015 | Lee | G06F 9/3851 |
| | | | | 712/241 |
| 2020/0210113 | A1* | 7/2020 | Bai | G06F 3/0604 |
| 2021/0334106 | A1* | 10/2021 | Etsion | G06F 13/4027 |

OTHER PUBLICATIONS

Lirong Zheng, Hui Zhang, Weili Han, Xiaolin Zhou, Jing He, Zhi Zhang, Yun Gu, Junyu Wang, et al. Technologies, applications, and governance in the internet of things. Internet of things—Global technological and societal trends. From smart environments and spaces to green ICT, 2011.
Andrew Crotty, Alex Galakatos, Kayhan Dursun, Tim Kraska, Ugur Cz etintemel, and Stanley B Zdonik. Tupleware: "Big" Data, Big An-alytics, Small Clusters. In CIDR, 2015.
Frank Bouwens, Mladen Berekovic, Bjorn De Sutter, and Georgi Gay-dadjiev. Architecture enhancements for the ADRES coarse-grained reconfigurable array. In International Conference on High-Performance Embedded Architectures and Compilers, pp. 66-81. Springer, 2008.

(Continued)

*Primary Examiner* — Zachary K Huson
(74) *Attorney, Agent, or Firm* — POLSINELLI PC

(57) ABSTRACT

Various embodiments of a system and associated method for generating a valid mapping for a computational loop on a CGRA are disclosed herein. In particular, the method includes generating randomized schedules within particular constraints to explore greater mapping spaces than previous approaches. Further, the system and related method employs a feasibility test to test validity of each schedule such that mappings are only generated from valid schedules.

20 Claims, 12 Drawing Sheets

(56) References Cited

OTHER PUBLICATIONS

Chris Nicol. A Coarse Grain Reconfigurable Array (CGRA) for Statically Scheduled Data Flow Computing. Wave Computing White Paper, 2017.
Yu-Hsin Chen, Tushar Krishna, Joel S Emer, and Vivienne Sze. Eyeriss: An Energy-Efficient Reconfigurable Accelerator for Deep Convolutional Neural Networks. IEEE Journal of Solid-State Circuits, 52(1):127-138, 2017.
Yu-Hsin Chen, Joel Emer, and Vivienne Sze. Eyeriss: A Spatial Architecture for Energy-Efficient Dataflow for Convolutional Neural Networks. ACM SIGARCH Computer Architecture News, 44(3):367-379, 2016.
Xitian Fan, Huimin Li, Wei Cao, and Lingli Wang. DT-CGRA: Dual-track Coarse-Grained Reconfigurable Architecture for Stream Applica¬tions. In 2016 26th International Conference on Field Programmable Logic and Applications (FPL), pp. 1-9. IEEE, 2016.
Devereaux Conrad Chen. Programmable arithmetic devices for high speed digital signal processing. PhD thesis, Citeseer, 1992.
Reiner W Hartenstein and Rainer Kress. A Datapath Synthesis System for the Reconfigurable Datapath Architecture. In Proceedings of ASP-DAC'95/CHDL'95/VLSI'95 with EDA Technofair, pp. 479-484. IEEE, 1995.
Ethan Mirsky, Andre DeHon, et al. MATRIX: a reconfigurable comput¬ing architecture with configurable instruction distribution and deployable resources. In FCCM, vol. 96, 1996.
Hartej Singh, Ming-Hau Lee, Guangming Lu, Fadi J Kurdahi, Nader Bagherzadeh, and Eliseu M Chaves Filho. MorphoSys: An Integrated Reconfigurable System for Data-Parallel and Computation-Intensive Applications. IEEE transactions on computers, 49(5):465-481, 2000.
Mahdi Hamzeh, Aviral Shrivastava, and Sarma Vrudhula. EPIMap: Using epimorphism to map applications on CGRAs. In Proceedings of the 49th Annual Design Automation Conference, pp. 1284-1291. ACM, 2012.
B Mei, M Berekovic, and JY Mignolet. ADRES & DRESC: Architecture and compiler for coarse-grain reconfigurable processors. In Fine- and coarse-grain reconfigurable computing, pp. 255-297. Springer, 2007.
Hyunchul Park, Kevin Fan, Manjunath Kudlur, and Scott Mahlke. Modulo Graph Embedding: Mapping Applications onto Coarse-Grained Reconfigurable Architectures. In Proceedings of the 2006 international conference on Compilers, architecture and synthesis for embedded systems, pp. 136-146. ACM, 2006.
Hyunchul Park, Kevin Fan, Scott A Mahlke, Taewook Oh, Heeseok Kim, and Hong-seok Kim. Edge-centric modulo scheduling for coarse-grained reconfigurable architectures. In Proceedings of the 17th international conference on Parallel architectures and compilation techniques, pp. 166-176. ACM, 2008.
Taewook Oh, Bernhard Egger, Hyunchul Park, and Scott Mahlke. Recur rence cycle aware modulo scheduling for coarse-grained reconfigurable architectures. In ACM Sigplan Notices, vol. 44, pp. 21-30. ACM, 2009.
Liang Chen and Tulika Mitra. Graph minor Approach for Application Mapping on CGRAs. ACM Transactions on Reconfigurable Technology and Systems (TRETS), 7(3):21, 2014.
Mahdi Hamzeh, Aviral Shrivastava, and Sarma Vrudhula. REGIMap: Register-aware Application Mapping on Coarse-Grained reconfigurable architectures (CGRAs). In Proceedings of the 50th Annual Design Automation Conference, p. 18. ACM, 2013.
Shail Dave, Mahesh Balasubramanian, and Aviral Shrivastava. RAMP: Resource-Aware Mapping for CGRAs. In Proceedings of the 55th Annual Design Automation Conference (DAC), 2018.
Shouyi Yin, Xianqing Yao, Dajiang Liu, Leibo Liu, and Shaojun Wei. Memory-aware Loop Mapping on Coarse-Grained Reconfigurable Architectures. IEEE Transactions on Very Large Scale Integration (VLSI) Systems, 24(5):1895-1908, 2016.
B Ramakrishna Rau. Iterative Modulo Scheduling. International Journal of Parallel Programming, 24(1), 1996.
Benmao Cheng, Hong Wang, Shiyuan Yang, Daoheng Niu, and Yang Jin. A Novel Testability-oriented Data Path Scheduling Scheme in High-Level Synthesis. Tsinghua Science & Technology, 12:134-138, 2007.
Dajiang Liu, Shouyi Yin, Leibo Liu, and Shaojun Wei. Polyhedral model based mapping optimization of loop nests for CGRAs. In Design Automation Conference (DAC), 2013 50th ACM/EDAC/IEEE, pp. 1-8. IEEE, 2013.
Ganghee Lee, Kiyoung Choi, and Nikil D Dutt. Mapping multidomain applications onto coarse-grained reconfigurable architectures. IEEE Transactions on Computer-Aided Design of Integrated Circuits and Systems, 30(5):637-650, 2011.
Akira Hatanaka and Nader Bagherzadeh. A modulo scheduling algo¬rithm for a coarse-grain reconfigurable array template. In Parallel and Distributed Processing Symposium, 2007. IPDPS 2007. IEEE Interna¬tional, pp. 1-8. IEEE, 2007.
Giovanni Ansaloni, Kazuyuki Tanimura, Laura Pozzi, and Nikil Dutt. Integrated kernel partitioning and scheduling for coarse-grained recon-figurable arrays. Computer-Aided Design of Integrated Circuits and Systems, IEEE Transactions on, 31(12):1803-1816, 2012.
Dhananjaya Wijerathne, Zhaoying Li, Manupa Karunarathne, Anuj Pathania, and Tulika Mitra. CASCADE: High Throughput Data Stream¬ing via Decoupled Access-Execute CGRA. ACM Transactions on Embedded Computing Systems (TECS), 18(5s):1-26, 2019.
Manupa Karunaratne, Aditi Kulkarni Mohite, Tulika Mitra, and Li-Shiuan Peh. HyCUBE: A CGRA with reconfigurable single-cycle multi-hop interconnect. In Proceedings of the 54th Annual Design Automation Conference 2017, pp. 1-6, 2017.
Matthew Guthaus et al. MiBench: A free, commercially representative embedded benchmark suite. In WWC, 2001.
Shuai Che, Michael Boyer, Jiayuan Meng, David Tarjan, Jeremy W Sheaffer, Sang-Ha Lee, and Kevin Skadron. Rodinia: A benchmark suite for heterogeneous computing. In 2009 IEEE international symposium on workload characterization (IISWC), pp. 44-54. Ieee, 2009.
John A Stratton, Christopher Rodrigues, I-Jui Sung, Nady Obeid, Li-Wen Chang, Nasser Anssari, Geng Daniel Liu, and Wen-mei W Hwu. Parboil: A revised benchmark suite for scientific and commercial throughput computing. Center for Reliable and High-Performance Computing, 127, 2012.
Shail Dave and Aviral Shrivastava. CCF: A CGRA Compilation Framework. 2018.
Chris Lattner and Vikram Adve. LLVM: A compilation framework for lifelong program analysis & transformation. In CGO, 2004.
Kyuseung Han, Junwhan Ahn, and Kiyoung Choi. Power-efficient predication techniques for acceleration of control flow execution on cgra. ACM Transactions on Architecture and Code Optimization (TACO), 10(2):8, 2013.

\* cited by examiner

| Nodes | IMS at II = 4 |
|---|---|
| a | 0 |
| b | 1 |
| c | 1 |
| d | 2 |
| e | 3 |
| f | 0 |
| g | 1 |
| h | 1 |
| i | 2 |

| Nodes | Res Cons. ASAP | Res Cons. ALAP | CRIMSON Schedule |
|---|---|---|---|
| a | 0 | 2 | 0 |
| b | 1 | 3 | 1 |
| c | 1 | 3 | 1 |
| d | 2 | 4 | 2 |
| e | 3 | 5 | 0 |
| f | 0 | 2 | 0 |
| g | 1 | 3 | 1 |
| h | 1 | 3 | 2 |
| i | 2 | 4 | 2 |

SYSTEMS AND METHODS FOR IMPROVED MAPPING OF COMPUTATIONAL LOOPS ON RECONFIGURABLE ARCHITECTURES

CROSS-REFERENCE TO RELATED APPLICATIONS

This is a non-provisional application that claims benefit to U.S. Provisional Patent Application Ser. No. 63/117,684 filed 24 Nov. 2020, which is herein incorporated by reference in its entirety.

GOVERNMENT SUPPORT

This invention was made with government support under grants 1525855 and 1723476 awarded by the National Science Foundation. The government has certain rights in the invention.

FIELD

The present disclosure generally relates to hardware acceleration, and in particular to a system and associated method for improved scheduling and mapping of Coarse-Grained Reconfigurable Arrays for acceleration of computational loops.

BACKGROUND

Application-specific integrated circuits (ASICs) are often used to accelerate computationally-intensive operations; in particular, coarse-grained reconfigurable arrays (or architectures) (CGRAs) are one variant of ASICs that include a plurality of "processing elements" (i.e. functional units) that allow configurability at a word level to execute computationally intensive loops. Various techniques exist for scheduling and mapping the execution of computationally intensive loops, however the present technologies can be inefficient in finding the best scheduling and mapping configurations by exploring mapping spaces that are not valid.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
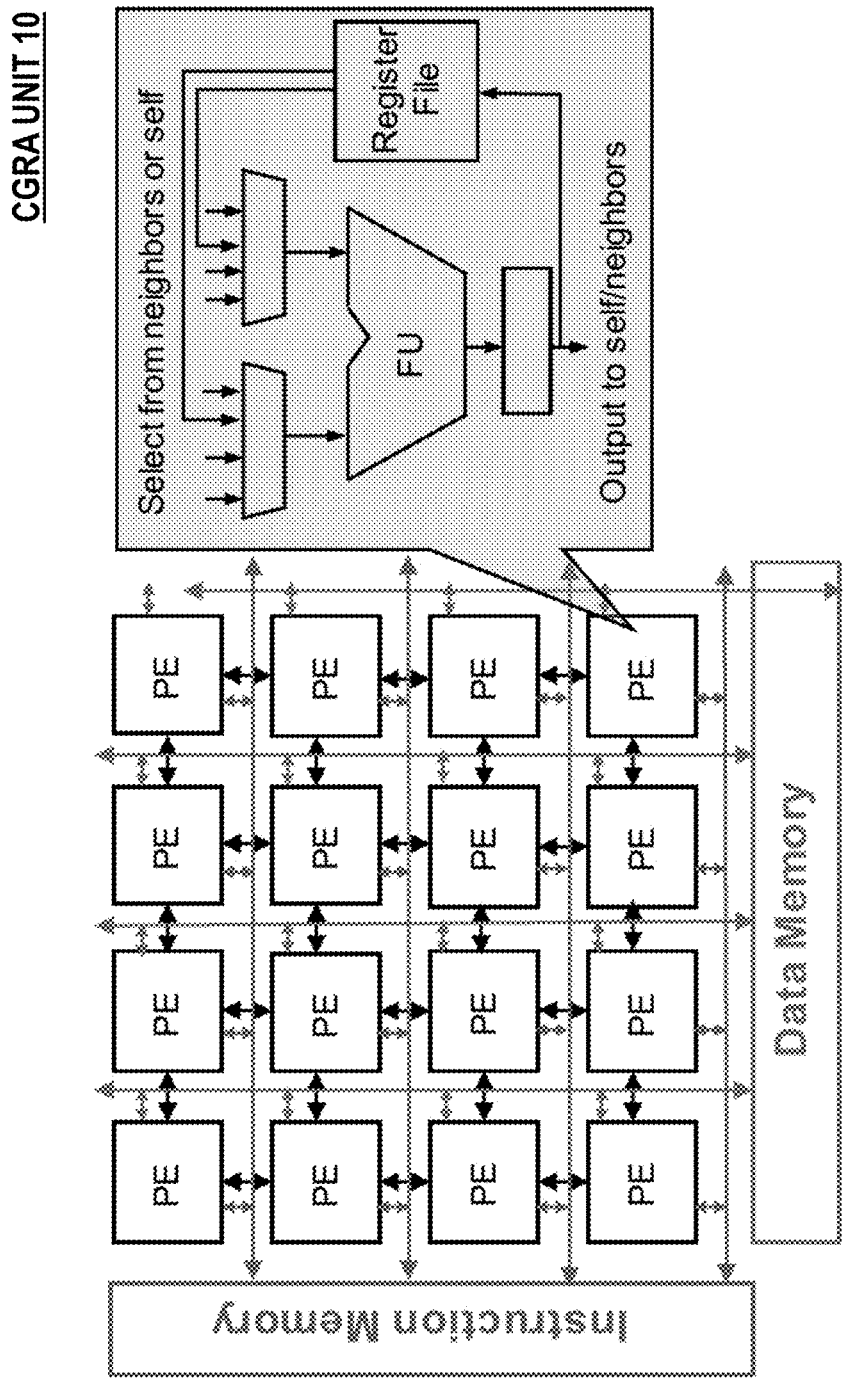
FIG. 1 is an illustrative representation of an architecture of a typical coarse-grained reconfigurable array (CGRA)

Various embodiments of a Randomized Iterative Modulo Scheduling and Optimized Mapping system (sometimes referred to herein as CRIMSON) to improve mapping of computationally-intensive loops for use in Course-Grained Reconfigurable Array (CGRA) hardware accelerators are disclosed herein. The system is shown to be capable of successfully mapping in a CGRA space by creating randomized schedules to explore a broader schedule space. In one aspect, the system employs a feasibility test to examine each random schedule that is produced, as well as routing resources required and resource usage. Any feasible mapping produced invokes an associated mapping algorithm. Any unmappable schedules that are detected are eliminated and their respective associated mapping algorithms are not invoked. Thus, the system saves computing time and accelerates computing rate by reducing unnecessary computing times of unmappable schedules. Referring to the drawings, embodiments of a Randomized Iterative Modulo Scheduling and Optimized Mapping system, otherwise referred to herein as "CRIMSON" or "the system" are illustrated and generally indicated as 100 in FIGS. 1-10.

Introduction and Terminology

Computing demands in human society continue to climb. Today there are numerous devices that collect, process, and communicate data from multiple sources such as the Internet, Cyber-Physical and Autonomous Systems, sensor networks, etc. Extracting intelligent and actionable information from large quantities of data—whether or not done by machine learning—is extremely computationally-intensive, and oftentimes limited by power, thermal, and other resource constraints. Efficiency in the execution of these functionalities can be achieved by using Application-Specific Integrated Circuits (ASICs). However, they suffer from high production costs, and they quickly become obsolete as applications and algorithms evolve. Another promising alternative is Field Programmable Gate Arrays or FPGAs, but they lose efficiency in providing bit-level configurability, which is essential for their primary purpose—prototyping. Coarse-grained reconfigurable architectures or CGRAs provide a very good middle ground with coarse-grain configurability (word and arithmetic operator-level), without much loss in power-efficiency when compared to ASICs. As a result, there is a renewed surge in the application of CGRAs for computationally-intensive workloads including machine learning, embedded systems, and vision functionalities.

As shown in FIG. 1, a simplified CGRA unit 10 is shown including an array of Processing Elements (PEs) arranged in a 2-D grid. In some CGRAs, PEs are "bare" Arithmetic Logic Units (ALUs) that can receive inputs from the neighboring PEs, from Data Memory, and its own small set of registers. At every cycle, the PEs each receive an instruction from Instruction Memory, and write the results to an output buffer, local register file, and/or the data memory. CGRA-based execution is highly parallel (16 operations can be executed simultaneously on a 4×4 CGRA) and power-efficient because instructions are in the pre-decoded form. There exists no extensive pipeline for instructions to go-through before and after execution, and the PEs can exchange operands directly rather than going through the register files.

The most common way to use CGRAs is to employ them as co-processors to CPU cores or processors, to speed up and power-efficiently execute compute-intensive applications—similar to GPUs. The execution of computationally-intensive loops in the application can then be "offloaded" onto these CGRA co-processors, while the rest of the application can still execute on the CPU. This heterogeneous computing paradigm requires compiler support to map computationally-intensive loops of the application onto the PEs of the CGRA. Since the execution of a loop happens by software pipelining on a CGRA, the objective of mapping is to lay out the nodes of the DFG onto a graph of the CGRA extended in time, so that the nodes can exchange operands through interconnection among the PEs and achieve correct and efficient execution. A repetition interval of the mapping (the time at which the next iteration of the loop can start) is called the Initiation Interval (II) and is the metric that determines the quality of mapping.

Many techniques have been developed to solve NP-complete mapping problem of CGRAs efficiently. Most of the newer methods work in these four steps: i) create a Data Flow Graph (DFG) of a loop, and estimate a minimal II, ii) create a CGRA graph unrolled II times, iii) schedule nodes of the loop onto the CGRA graph, and finally, iv) map the nodes onto the PEs at their scheduled timeslots such that the dependencies among the nodes can be transferred through the connectivity among PEs. In case a valid mapping is not found, the II is increased, and steps from ii) onward are executed again. This process is repeated until a valid mapping is found. A mapping failure can occur in the fourth step due to limited connectivity among the PEs of the CGRA and because of the need to map new routing nodes. Routing nodes occur when dependent operations are scheduled in noncontiguous timeslots. In this case, the operands need to be routed from the PE on which the source operand is mapped, to the PE on which the destination operation is mapped. This is commonly referred to as the "routing problem". One solution is to route the operands through the PEs in the intermediate timeslots. Since routing and mapping attempts often fail, existing CGRA mapping techniques have heavily focused on solving the problem encountered in the mapping and routing step. For example, route dependencies via PEs, routes dependencies through the registers inside the PEs, overlaps the routing paths carrying the same value, and uses re-computation as an alternative to routing. MEMMap routes dependent operations via data memory by adding store and load nodes. RAMP proposes a heuristic to explore all the different routing options. However, all the previous approaches use the same Iterative Modulo Scheduling (IMS) to find a valid schedule—and therein lies the problem.

TABLE I

Performance of previous methodologies

| | | 4 × 4 | | |
|---|---|---|---|---|
| Suites | Loops | MII | RAMP-II | GraphMinor-II |
| MiBench | bitcount | 3 | 3 | 6 |
| | susan | 2 | 3 | 3 |
| | sha | 3 | 3 | 3 |
| | jpeg1 | 3 | X | X |
| | jpeg2 | 2 | X | X |
| Rodinia | kmeans1 | 2 | 2 | 2 |
| | kmeans2 | 2 | 2 | 2 |
| | kmeans3 | 2 | 2 | 2 |
| | kmeans4 | 2 | 2 | 2 |
| | kmeans5 | 2 | 2 | 2 |
| | lud1 | 2 | 2 | 2 |
| | lud2 | 2 | 2 | 2 |
| | b + tree | 2 | 2 | 2 |
| | streamcluster | 2 | 2 | 2 |
| | nw | 2 | 2 | 2 |
| | BFS | 2 | 2 | 2 |
| | hotspot3D | 5 | X | X |
| | backprop | 5 | X | X |
| Parboil | spmv | 3 | 3 | 3 |
| | histo | 2 | 2 | 2 |
| | sad1 | 2 | 2 | X |
| | sad2 | 2 | 2 | 2 |
| | sad3 | 2 | 2 | X |
| | stencil | 4 | X | X |

The problem with IMS is that it only generates a resource-constrained, "As Soon As Possible" (ASAP) schedule of nodes onto the CGRA PEs. When a mapping is not found, traditional mapping techniques increase the II, and return to the scheduling step. The generated schedule does not change much, even when more resources are added towards the bottom of the CGRA graph. The resource-constrained ASAP schedule will be almost identical to the one obtained before, and the extra resources are not used. As a result, the mapping algorithm keeps on exploring the schedule space with the same schedule, and often no mapping can be found, even after huge increases in the II. Table I shows the evaluation of the 24 performance-critical loops from MiBench, Rodinia and Parboil on a 4×4 CGRA, while being executed on the state-of-the-art IMS based mapping algorithms, GraphMinor and RAMP. It is shown that state-of-the-art RAMP was unable to find a valid mapping for five loops and GraphMinor was unable to find a valid mapping for seven loops on evaluation up to a maximum II=50. One major observation was that, when these previous algorithms find a mapping, they achieve a very good II, but when the mapping fails, they are unable to map the loops even with II increments up to 50. For example in loop jpeg1, while the minII was 3, both the techniques were unable to map the loop, even when the II was increased to 50. Thus, the main problem in IMS is the absence of randomness in the scheduling algorithm. As a result, even when the II is increased, the same schedule is generated without obtaining a valid mapping.

Terminology

CGRA compilers in general first create a Data Flow Graph (DFG) D=(V, E) of a computationally-intensive loop, where V refers to a plurality of nodes of the loop and E refers to a plurality of edges (data dependencies between nodes) in the DFG. The constructed DFG is then software pipelined using IMS, where each node is assigned a schedule-time at which it should be executed. In modulo scheduling, the interval in which successive instructions can begin execution is called the Initiation Interval (II).

Figure 2D:
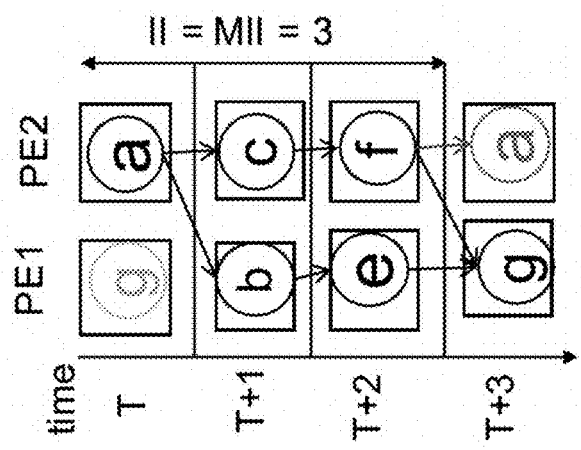
FIG. 2D is an illustrative representation showing mapping of the scheduled nodes shown in FIGS. 2A and 2C using the CGRA architecture of FIG. 2B.
Figure 2C:
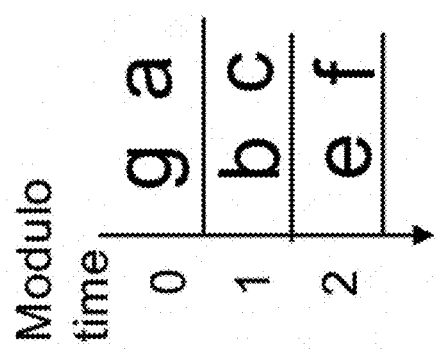
FIG. 2C is an illustrative representation showing an Iterative Modulo Scheduling (IMS) schedule of nodes of the data flow graph of FIG. 2A with respect to modulo time.
Figure 2B:
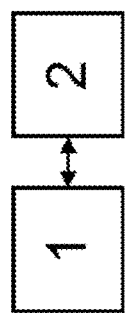
FIG. 2B is an illustrative representation showing a 1×2 CGRA "target" architecture.
Figure 2A:
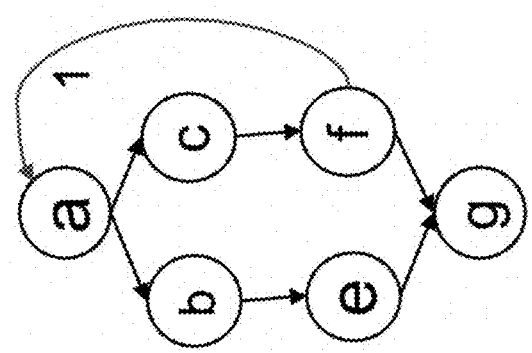
FIG. 2A is an illustrative representation showing a data flow graph (DFG) of an application loop executed by a CGRA such as the CGRA of FIG. 1.

FIGS. 2A-2D are illustrative of a simplified CGRA compiler example. In particular, FIG. 2A shows an example DFG of a loop, and FIG. 2B shows an example target CGRA architecture. A corresponding schedule of the DFG nodes is shown in FIG. 2C, considering resource and recurrence cycle constraints. After scheduling, the nodes are then mapped onto the PEs of the CGRA such that the dependent operands can be routed from the PE on which the source operation is mapped to the PE on which the destination operation is mapped through either registers, memory or paths in the CGRA graph. A register can be used to route operands when the dependent operation is mapped to the same PE as the source operation. Memory can be used to route operands, but that requires inserting additional load and store instructions. A path is a sequence of edges and nodes in the CGRA graph that connect two PEs. In the simplest case, a path is just a single edge.

For simplicity, the mapping shown in FIG. 2D uses only edges to route dependencies. In this mapping, node a of iteration i is mapped to PE2 at time T, nodes b and c are mapped to PEs, PE1 and PE2 respectively, at T+1. Similarly, nodes e, f of $i^{th}$ iteration are mapped in PE1 and PE2 respectively at T+2. Node g of $i^{th}$ iteration is mapped at PE1 at T+3. It can also be observed that a and g are mapped at T and T+3 in PE1 and PE2. Modulo schedule repeats itself every II cycles, in this case II=3. The node g at T (shown in gray) is from $(i-1)^{th}$ iterations. Likewise, the node a mapped at T+3 is from $(i+1)^{th}$ iteration (shown in green). Based on the schedule, which considers the recurrences while scheduling, mapping a in PE2 satisfies the recurrence constraint of $$f \xrightarrow{1} a.$$

i.e., the value of f at $i^{th}$ iteration can be routed to a at $(i+1)^{th}$ iteration. II is considered as the performance metric for DFG mapping onto CGRA, as the total number of cycles required to execute a loop will be proportional to the II.

IMS Motivating Example

Figure 3B:
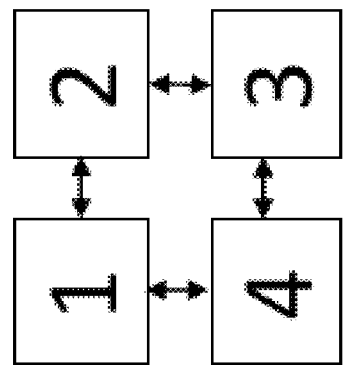
FIG. 3B is an illustrative representation showing a 2×2 CGRA "target" architecture.
Figure 3A:
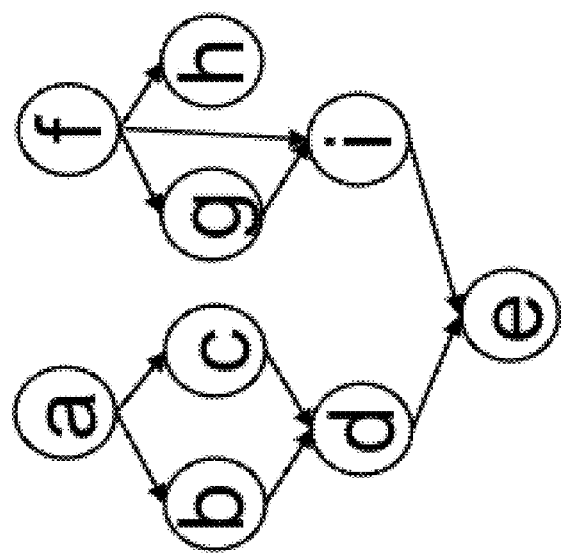
FIG. 3A is an illustrative representation showing a data flow graph of an application loop executed by a CGRA such as the CGRA of FIG. 1.
Figures 3C, 3D:
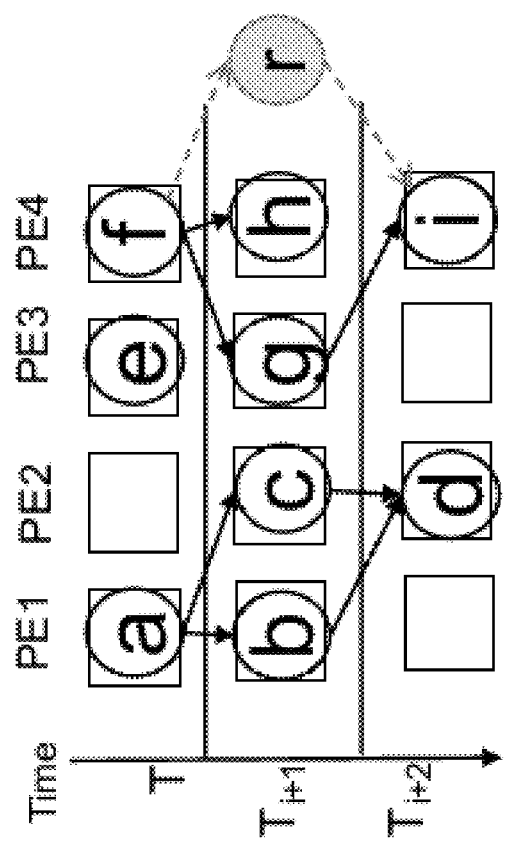
FIG. 3C is a table showing an IMS schedule with an initiation interval of 3 for each of a plurality of nodes of the data flow graph of FIG. 3A.
FIG. 3D is a graphical representation showing a failure of a typical system to find a valid mapping for the application loop of FIG. 3A based on the IMS schedule of FIG. 3C due to an additional routing node necessary to map the application loop of FIG. 3A.

FIGS. 3A-3F illustrate an example scheduling process using current IMS techniques. Consider the DFG of loop to be mapped on a 2×2 CGRA, shown in FIGS. 3A and 3B, respectively. Previous state-of-the-art techniques such as RAMP, receive a schedule from IMS before mapping the nodes. IMS starts by computing a resource constrained minimum II (ResMII) and a recurrence constrained minimum II (RecMII) from the DFG and the architecture description. For the given example in FIGS. 3A-3F, total nodes=9 and total resources available=4. The minimum II (MII) is the maximum of RecMII and ResMII. Therefore for the above example, MII=ResMII=[9/4]=3. After computing the MII, IMS sets the priorities for each node. Priority is a number assigned to each node, which is utilized during scheduling. Based on the height of the node, from the given DFG, the deepest node is given the least priority using depth-first search strategy. For the loop DFG given in FIG. 3A, node e gets priority 0, nodes d and i get priority 1, nodes b, c, g, h get priority 2 and finally a and f get priority 3. The nodes with higher priority number are scheduled first with earliest start time. Modulo scheduling starts with II=MII for scheduling the nodes. The CGRA is time-extended, II times and a modulo resource table (MRT) is maintained to check for resource overuse for each timeslot. While trying to schedule each node, resource conflicts are checked. If there is a resource conflict a higher schedule time is tried. For the example DFG, the II=MII=3. Nodes a and f are scheduled at modulo time 0 (0%3). Nodes b, c, g, and h are scheduled at modulo time 1 (1%3) without any resource constraint because there are 4 resources (PEs) at each modulo time. Nodes d and i are scheduled at modulo time 2 (2%3). Finally, e is scheduled at modulo time 0 (3%3). The IMS schedule of nodes (shown in column 1 of FIG. 3C)) at II=3 is shown in FIG. 3C column 2.

With this prescribed schedule, mapping algorithms start to map the nodes, but eventually find that a routing node needs to be added to route operation f and i. Due to the unavailability of PEs in that timeslot a routing node cannot be added, as shown in FIG. 3D. At this juncture, the mapping algorithm increases the II in an effort to find a schedule that is mappable. On increasing the II from 3 to 4, the IMS algorithm is invoked again to get a schedule. Since the priority calculation of IMS is DFG-based, all the nodes get the same priority. Now, IMS algorithm starts to schedule nodes based on the priorities for each node. Nodes a and f are scheduled at modulo time 0 (0%4). Nodes b, c, g, and h are scheduled at modulo time 1 (1%4). Nodes d and i are scheduled at modulo time 2 (2%4) and e is scheduled at modulo time 3 (3%4). The IMS schedule for II=4 is shown in column 2 of FIG. 3E. Again, on failure to map, the mapping algorithm increases the II to 5. IMS repeats the process of assigning priorities to the nodes and as seen in II=4, the priorities do not change. Nodes a and f are scheduled at modulo time 0 (0%5). Nodes b, c, g, and h are schedule at modulo time 1 (1%5). Nodes d and i are scheduled at modulo time 2 (2%5) and finally e is scheduled at modulo time 3 (3%5). On comparing the schedules obtained for II=3, II=4, and II=5, it can be seen that only node e has a different schedule time (from II=3 to II=4) and rest of the nodes have the same schedule. Hence, with IMS, it can be seen that an increase in the II does not correspond to a change in modulo schedule time of the nodes.

The original IMS algorithm keeps trying to find a valid mapping at higher II even when there is a mapping failure at a given modulo schedule. This process keeps on repeating endlessly. In a workflow of previous techniques, after finding the MinII and obtaining an IMS schedule, the mapping of the nodes begin assuming that the schedule is mappable. There are no mechanisms to statically and systematically find the feasibility of the obtained schedule, which results in an infinite loop between the scheduling and the mapping stages.

System Introduction

There exists a need for an enhanced scheduling algorithm that explores the schedule space to increase the mappability of the compute-intensive loops. Referring to FIGS. 4-6B, the present disclosure describes a system 100 for Compute-intensive loop acceleration by Randomized Iterative Modulo Scheduling and Optimized mapping on a CGRA unit 10. The system 100 includes a computing device 300 that executes CGRA scheduling processes/services 314 to map feasible computational loops onto a CGRA unit 10. Instead of using only a Resource Constrained As Soon As Possible (RC ASAP) schedule like regular IMS, the system 100 generates both a RC ASAP schedule representative of a lower bound timeslot and a Resource Constrained As Late As Possible (RC ALAP) schedule representative of an upper bound timeslot for all nodes of a DFG. The system 100 then selects a random timeslot between the associated RC ASAP timeslot and RC ALAP timeslot as the scheduling time for each node. As a result, each time a "new" random schedule is obtained, the system 100 is able to effectively explore the schedule space. The system 100 also incorporates a conservative feasibility test after the scheduling step to check the mappability of the obtained random schedule. This conservative test makes sure that the generated schedule will be mappable even after the addition of the new routing nodes, thereby rendering feasibility by quickly weeding out some unmappable schedules, and saving time. Among 24 performance-critical (that account for more than 7% of execution time of the application) loops from MiBench, Rodinia, and Parboil, the system 100 was able to map all the loops for various CGRA sizes ranging from 4×4 to 8×8. The system 100 achieved a comparable II for the loops which were mappable by RAMP.

System Overview

Figure 5:
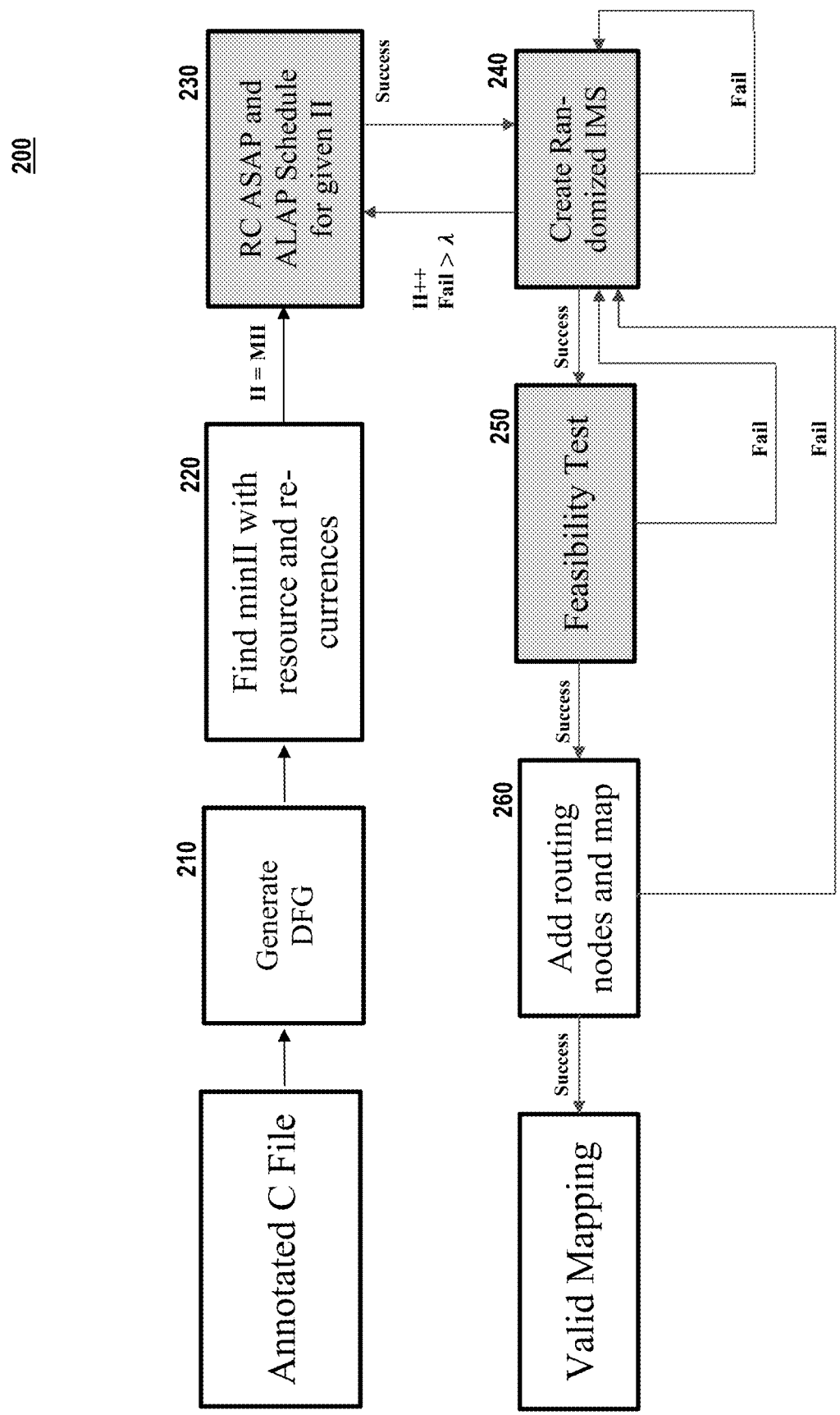
FIG. 5 is a flowchart showing a method for scheduling and mapping of CGRAs according to the system of FIG. 4.

Referring directly to the flow diagram of FIG. 5, to alleviate the challenges posed by IMS and the previous mapping algorithms, the system 100 randomizes a schedule time of each node of the DFG by selecting a time at random between a lower bound modulo timeslot (RC ASAP) and an upper bound modulo timeslot (RC ALAP). Additionally, the system 100 performs a feasibility test for each randomized schedule before mapping. In particular, a DFG is generated at block 210 from a file representative of the computational loop that needs to be performed. A resource constrained minimum II (ResMII) and a recurrence constrained minimum II (RecMII) are determined using the DFG at block 220. A lower bound timeslot (RC ASAP) schedule and an upper bound timeslot (RC ALAP) schedule are then generated at block 230 for all nodes of the DFG for a given II. A "Create Randomized Schedule" block is executed at block 240 of FIG. 5 and described in Algorithm 1 and a "find a random modulo schedule time" is described in Algorithm 2. On a failure to find a schedule, "Create Randomized IMS" block is invoked A times before increasing the II. When the system obtains a random modulo schedule, a feasibility test at block 250 statically analyzes if the obtained random schedule honors the resource constraints when routing nodes are added. If a schedule is found to be infeasible due to possible resource overuse, then a different modulo schedule is tried for the same II. If the random schedule obtained is valid and feasible, then the mapping algorithm is called at block 260 to add routing nodes and map the scheduled DFG onto the CGRA unit 10.

Algorithm 1: Rand_Iterative_Mod_Schedule
(Input DFG D, CGRA CA, Input II)

```
1   D' ← D;
2   SCCS ← Find_List_of_Sccs(D');
3   Find_RC_ASAP(II, Sccs, CA);
4   Find_RC_ALAP(II, Sccs, CA);
5   unscheduled ← Sort_Sccs(Sccs);
6   Set_Scheduled_op_false(unscheduled);
7   iter ← 0;
8   while unscheduled_size > 0 & iter < threshold do
9   |    operation ← unscheduled[0];
10  |    TimeSlot ←
    |       Find_Random_ModuloTime(operation, CA);
11  |    if (schedule(nodes, TimeSlot)) then
12  |    |    scheduled ← nodes;
13  |    else
14  |    |    return failure;
15  |    unscheduled ←
    |       Subtract(unscheduled, scheduled);
16  |    iter++;
17  if (iter == threshold & unscheduled_size > 0 ) then
18  |    return failure;
19  return success;
```

Algorithm 2: Find_Random_ModuloTime
(Operation op, CGRA CA)

```
1   op_ASAP ← get_RC_ASAP(op);
2   op_ALAP ← get_RC_ALAP(op);
3   sched_slot ← Ø;
4   timeslots ← get_all_timslots(op_ASAP,op_ALAP);
5   Randomize(timeslots);
6   while (sched_slot = = Ø & timslots_size > 0 ) do
7   |    currTime ← timeslots[0];
8   |    if (ResourceConflict(op, currTime, CA)) then
9   |    |    timeslots ← Subtract(currTime, timeslots);
10  |    |    continue;
11  |    else
12  |    |    sched_time ← currTime
13  if (sched_slot == Ø) then
14  |    if (!Scheduled[op] ||
    |       op_ASAP > Prev_Sched_Time[op] ) then
15  |    |    sched_slot ← op_ASAP;
16  |    else
17  |    |    sched_slot ← Prev_Sched_Time[op] + 1;
18  return sched_slot;
```

Computing Resource-Constrained ASAP and Resource-Constrained ALAP

Algorithm 1 shows the randomized iterative modulo scheduling algorithm of the system 100. Lines 1-2 finds the lower bound timeslot (RC ASAP) from the Strongly Connected Components (SCCs) of the DFG. The lower bound timeslot (RC ASAP) is computed in Line 3 of Algorithm 1 as a top-down, depth-first search approach, from the nodes that do not have any incoming edges in the current iteration. After computation of the lower bound timeslot (RC ASAP), the upper bound timeslot (RC ALAP) is computed, starting from the nodes that do not have any outgoing edges in the current iteration and in a bottom-up (reverse), depth-first search manner, in Line 4 of Algorithm 1.

Randomized Scheduling Algorithm

After computing the lower and upper bound timeslots, Algorithm 1 Line 5 shows the system 100 populating an array of unscheduled nodes, whereas line 6 sets a Boolean Scheduled operation to false for all the nodes, which is used in Algorithm 2. For all the unscheduled sorted nodes in the array, the system 100 picks a random modulo timeslot by honoring the resource constraints maintained by MRT, in Line 10 of the Algorithm 1.

The schedule( ) function in Line 11 of Algorithm 1 schedules the node at chosen random timeslot. This schedule function sets the schedule time of the current operation and consecutively displaces the nodes that have resource conflicts. Previously scheduled nodes having a dependence conflicts with the current operation are also displaced after updating the RC ASAP and RC ALAP based on the current schedule operation. The displaced nodes are added to queue of unscheduled nodes. The iter is a high value. On a failure to find a schedule, either due to unscheduled nodes (lines 13-14) or if the iter value is greater than a threshold (lines 17-18), the Algorithm 1 is invoked again. This is repeated λ times before increasing the II in attempt to find a valid schedule. This λ value is not reset for a particular II and used to control the failure due to unmappable schedule or a failure in the mapping step. The A value is described in greater detail below.

Algorithm 2 is called by the randomized iterative modulo schedule (Rand Iterative Mod Schedule) Algorithm 1 line 10, to find a random timeslot between RC ASAP and RC ALAP. The RC ASAP and RC ALAP for a given operation is retrieved in lines 1-2 of Algorithm 2. Then, an array of timeslots is constructed using the op ASAP and op ALAP, line 4 of Algorithm 2. The array holds all the timeslots from op ASAP with an increasing value of 1 until op ALAP. If op ASAP is equal to op ALAP then the array size is one with either ASAP or the ALAP time. Each timeslot from the randomized array is checked for the resource constraint using MRT. The first valid timeslot is returned as the modulo schedule time for the operation. Due to the resource conflict if a valid timeslot is not present, there are two things to handle, (a) a timeslot for the operation should be chosen and (b) an already scheduled operation from that timeslot should be displaced. Concern (a) in handled in lines 13-17 of Algorithm 2 where if the nodes has not been scheduled previously, op ASAP is chosen as the schedule, else the previous schedule time of the operation is found and the modulo schedule time is computed using line 17. Concern (b) is addressed in the schedule( ) function in Algorithm 1 line 11, explained earlier.

Feasibility Test

Given a valid schedule, it still may not be possible to map because of two main reasons: i) limited connectivity among the PE nodes of the CGRA unit 10, and ii) the need to map the extra routing nodes that will be created as a result of scheduling. In a valid schedule, dependent operations may be scheduled in noncontiguous timeslots. When this is the case, the operands need to be routed from the PE on which the source operand is mapped, to the PE on which the destination operation is mapped. The operands can be routed using a string of consecutive CGRA interconnections and PEs. These PEs are referred to as routing PEs, and the operation that is mapped on these PEs (just forward the operand from input to output) is called a routing operation. Because of the addition of these routing nodes, the generated schedule may not be mappable. Previous techniques assume that the schedule is mappable and spend a lot of time searching for a mapping when none is available. In order to avoid wasting time in exploring unmappable schedules, the system 100 adds a conservative feasibility test to prune schedules that can be proven to be unmappable.

The feasibility test examines the random schedule produced, and for each routing resource that will be added in the future, it estimates the resource usage, considering path-sharing. The feasibility test checks if the total number of unique nodes including the routing nodes per timeslot is less than or equal to the number of PEs in that timeslot. schedule_nodes$_i$+routing_nodes$_i$<=PEs$_i$, where i is the modulo timeslot. This feasibility check is performed for all the II timeslots. The mapping algorithm is invoked only for schedules that are feasible, unlike previous approaches, where the mapping algorithm is invoked even for infeasible schedules. Since the time complexity of such mapping algorithms is high (time complexity of RAMP is $\mathcal{O}(N^8)$, where N=n*m, and 'n' is the total nodes in the loop DFG, and 'm' is the size of the CGRA unit 10), invoking them for infeasible schedules is counter-productive. The feasibility test reduces the overhead incurred by the mapping algorithm by pruning the infeasible schedules.

Determining the λ value

With every failure in the feasibility test, a new schedule is obtained for a given II. The number of times a schedule is obtained for a given II is controlled by the λ value. The scheduling space that can be explored for a given II is calculated by the product of the total nodes in the DFG, the size of the CGRA unit 10, and the II, given in Equation 1. A brute force exploration of the schedule space is time consuming. Lower λ values may increase the II prematurely, by superficial exploration of schedule space, whereas higher λ values increase the compilation time, due to elaborate exploration of the schedule space. Due to the randomness in the scheduling algorithm, a feasible schedule may be obtained faster by chance even for a higher λ value. The λ value is computed using $$\lambda = \text{exploration\_factor} \times n \times m \times II \qquad (1)$$

where 'n' is the total number of nodes in the loop DFG, 'm' is the size of the CGRA unit 10 and, exploration factor is the percentage of the schedule space that is to be explored. The exploration factor is a user defined parameter. II is also one of the parameters that determines the A value in Equation 1, which means that a new λ is computed for each II. When the II is increased, the scheduling space is also increased, therefore the scope of exploration is broadened.

Running Example

Figures 6A, 6B:
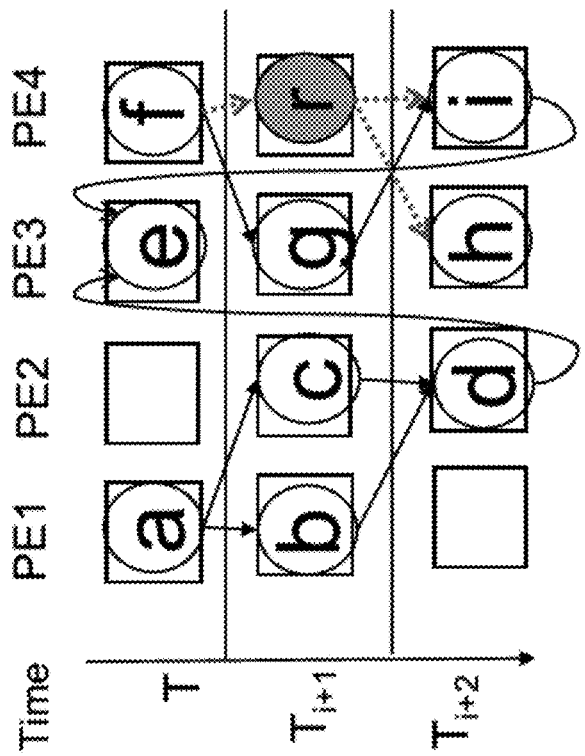
FIG. 6A is a table showing a resource-constrained "as soon as possible" value, a resource-constrained "as late as possible" value, and a modulo schedule for each node of the application loop of FIG. 3A by the system of FIG. 4.
FIG. 6B is an illustrative representation showing a valid mapping achieved by the system of FIG. 4 for the application loop of FIG. 3A based on the schedule shown in FIG. 6A.

FIGS. 6A and 6B show a running example of the randomized iterative modulo schedule algorithm of the system 100 for the DFG and CGRA architecture shown in the previous example of FIGS. 3A and 3B. Instead of assigning a priority based on height, like with regular IMS, each node in the DFG is assigned two time values: namely, a lower bound timeslot (RC ASAP) and upper bound timeslot (RC ALAP), which constitute respective lower and upper bounds for scheduling. The system 100 maintains a Modulo Resource Table (MRT) to check for resource overuse during RC ASAP and RC ALAP assignment. The RC ASAP is determined from the nodes that do not have any incoming edges in the current iteration. These nodes are allotted RC ASAP time=0, which means that the earliest start time of these nodes is at time 0. Based on the outgoing nodes from these start nodes and the delay of each operation, the RC ASAP of consecutive nodes are computed in a depth-first manner. For the DFG in FIG. 3A, nodes a and f are assigned the RC ASAP time as 0 in FIG. 6A. Nodes b, c, g, and h are assigned RC ASAP time as 1. Nodes d and i are assigned RC ASAP time 2 and node e is assigned RC ASAP time 3. The RC ASAP times for each node are shown in FIG. 6A, column 2. Next, starting from the last nodes of the DFG, i.e., nodes without any outgoing nodes in the current iteration, the nodes are assigned RC ALAP in a reverse depth-first search manner, using RC ALAP=RC ASAP+II-1. This ensures that RC ALAP>=RC ASAP. For the given DFG, e is assigned RC ALAP time 5, node h is assigned 3. Nodes d and i are assigned RC ALAP time 4. Nodes b, c and g are assigned RC ALAP time 3. Finally a and f are assigned RC ALAP time 2. The RC ALAP times of each node is shown in FIG. 6A, column 3.

After computing the RC ASAP and RC ALAP, the system 100 selects a random time between RC ASAP and RC ALAP for each node in order to schedule the nodes. The system 100 consults the Modulo Resource Table (MRT) to check for resource overuse in each II modulo timeslot. After checking for resource constraints the modulo schedule time is chosen for each node. This randomization of modulo schedule time creates flexibility of movement for the nodes, which explores different modulo schedule spaces, thereby increasing the chances of finding a valid mapping by the mapping algorithm. A randomized modulo schedule for the example DFG is shown in FIG. 6A, column 4, and a valid mapping for the scheduled nodes is shown in FIG. 6B at II=3. The loop that was previously unmappable due to the restrictive scheduling of IMS (FIGS. 3C-3E), is now mappable at II=3 due to randomization in assigning modulo schedule time.

Figures 3E, 3F:
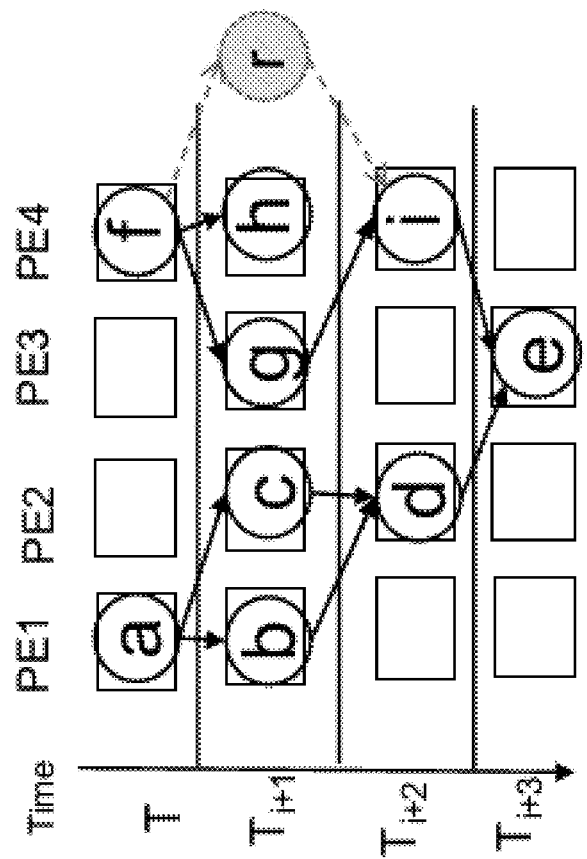
FIG. 3E is a table showing an IMS schedule with an initiation interval of 4 for each of a plurality of nodes of the data flow graph of FIG. 3A.
FIG. 3F is a graphical representation showing a failure of a typical system to find a valid mapping for the application loop of FIG. 3A even with an increased initiation interval of the IMS schedule of FIG. 3E.

If a closer look is taken at the RC ASAP and RC ALAP times shown in FIG. 6A columns 2 and 3, one can observe that there is a chance that the RC ASAP may be the modulo schedule chosen for all the nodes, since assigning a modulo schedule time for the nodes from RC ASAP and RC ALAP is randomized. As seen in FIGS. 3D and 3E, this schedule is not mappable. Unless there is a change to the workflow, there is a chance of finding a schedule that is unmappable and increasing the II to get a schedule process is repeated. To take care of this issue, the system 100 changes statistically computes the feasibility of the scheduled nodes prior to the mapping of the nodes. This makes sure that if a schedule is not mappable, a different random schedule is tried again for the same II. A number of times the mapping is tried for a given II is controlled by a threshold factor A. With induced randomization in mapping and changes to the workflow, the system 100 is able to achieve mapping of the application loops that were previously unmappable by IMS-based mapping techniques.

Experimental Setup

Benchmarks: The top three of the widely used benchmark suites were profiled: namely, MiBench, Rodinia, and Parboil. The top performance-critical, non-vectorizable loops were chosen for the experiments. Loops that could not be compiled or the loops that were memory bound were not considered.

Experiments were designed to consider only innermost loops so that a direct comparison with IMS can be made. These benchmarks depict a wide variety of applications from security, telecomm etc. to parallel, high-performance computing (HPC) loops like spmv (sparse matrix-vector product). These loops on average across all the benchmark loops, corresponds to ~50% of the total application execution time.

TABLE II

Benchmark Characteristics

| Suites | Loops | #nodes | #mem. nodes | #edges |
|---|---|---|---|---|
| MiBench | bitcount | 22 | 4 | 28 |
|  | susan | 31 | 8 | 35 |
|  | sha | 31 | 10 | 39 |

TABLE II-continued

Benchmark Characteristics

| Suites | Loops | #nodes | #mem. nodes | #edges |
|---|---|---|---|---|
|  | jpeg1 | 43 | 10 | 48 |
|  | jpeg2 | 28 | 6 | 33 |
| Rodinia | kmeans1 | 15 | 6 | 17 |
|  | kmeans2 | 16 | 6 | 17 |
|  | kmeans3 | 17 | 4 | 20 |
|  | kmeans4 | 16 | 4 | 19 |
|  | kmeans5 | 12 | 2 | 13 |
|  | lud1 | 21 | 4 | 24 |
|  | lud2 | 20 | 4 | 24 |
|  | b + tree | 13 | 2 | 13 |
|  | streamcluster | 16 | 4 | 19 |
|  | nw | 20 | 6 | 21 |
|  | BFS | 28 | 10 | 32 |
|  | hotspot3D | 76 | 20 | 96 |
|  | backprop | 39 | 16 | 44 |
| Parboil | spmv | 25 | 8 | 97 |
|  | histo | 18 | 4 | 20 |
|  | sad1 | 25 | 4 | 30 |
|  | sad2 | 19 | 4 | 20 |
|  | sad3 | 12 | 4 | 12 |
|  | stencil | 69 | 16 | 94 |

Compilation: For selecting the loops from the application and converting the loops to the corresponding DFG, CCF-CGRA Compilation Framework (LLVM 4.0 based) was used. On top of the existing framework, to effectively compile the loops with control-dependencies (If-Then-Else structures), partial predication was implemented as an LLVM pass, to convert the control-dependencies into data dependencies. Partial Predication can efficiently handle loops with nested if-else structures. The loop characteristics are shown in Table II including the number of nodes in the DFG (only computing nodes are included and constants that can be passed in the immediate field of the ISA are excluded) and number of memory (load/store) nodes. CCF framework produces DFG of the loop with separate address generation and actual load/store functionality. Furthermore, during the addition of routing resources after scheduling, a path-sharing technique is included. Path-sharing can reduce the redundant routing nodes added. The system 100 was implemented as a pass in the CCF framework including the A value computation and the feasibility test. The IMS-based state-of-the-art RAMP and GraphMinor were also implemented as a pass in CCF. As observed in Table I, RAMP has demonstrated equal or better results when compared to GraphMinor. Hence, the system 100 is compared against RAMP. The applications of the benchmark suites were compiled using optimization level 3 to avoid including loops that can be vectorized by compiler optimizations. 2D torus mesh CGRA of sizes 4×4, 5×5, 6×6, 7×7, and 8×8 were also considered.

Scheduling and Mapping Loops that could Otherwise not be Mapped

TABLE III

A comprehensive table showing the MII and II achieved by RAMP, an evaluated IMS-based heuristic, and CRIMSON (CRIM.) for 24 benchmark application loops from three major benchmark suites at 0.005 exploration factor.

|  |  | 4 × 4 | | | 5 × 5 | | | 6 × 6 | |
|---|---|---|---|---|---|---|---|---|---|
| Suites | Loops | MII | RAMP | CRIM. | MII | RAMP | CRIM. | MII | RAMP |
| MiBench | bitcount | 3 | 3 | 3 | 3 | 3 | 3 | 3 | 3 |
|  | susan | 2 | 3 | 4 | 2 | 2 | 2 | 2 | 2 |
|  | sha | 3 | 3 | 4 | 2 | X | 3 | 2 | 3 |
|  | jpeg1 | 3 | X | 6 | 2 | X | 4 | 2 | 2 |
|  | jpeg2 | 2 | X | 5 | 2 | X | 3 | 2 | X |

TABLE III-continued

A comprehensive table showing the MII and II achieved by RAMP, an evaluated IMS-based heuristic, and CRIMSON (CRIM.) for 24 benchmark application loops from three major benchmark suites at 0.005 exploration factor.

| Suites | Loops | | | | | | | | |
|---|---|---|---|---|---|---|---|---|---|
| Rodinia | kmeans1 | 2 | 2 | 2 | 2 | 2 | 2 | 2 | 2 |
| | kmeans2 | 2 | 2 | 2 | 2 | 2 | 2 | 2 | 2 |
| | kmeans3 | 2 | 2 | 2 | 2 | 2 | 2 | 2 | 2 |
| | kmeans4 | 2 | 2 | 2 | 2 | 2 | 2 | 2 | 2 |
| | kmeans5 | 2 | 2 | 2 | 2 | 2 | 2 | 2 | 2 |
| | lud1 | 2 | 2 | 2 | 2 | 2 | 2 | 2 | 2 |
| | lud2 | 2 | 2 | 2 | 2 | 2 | 2 | 2 | 2 |
| | b + tree | 2 | 2 | 2 | 2 | 2 | 2 | 2 | 2 |
| | streamcluster | 2 | 2 | 2 | 2 | 2 | 2 | 2 | 2 |
| | nw | 3 | 3 | 3 | 2 | 2 | 2 | 2 | 2 |
| | BFS | 2 | 2 | 3 | 2 | 3 | 3 | 2 | 2 |
| | hotspot3D | 5 | X | 10 | 4 | X | 7 | 4 | X |
| | backprop | 5 | X | 7 | 4 | 4 | 4 | 3 | 3 |
| Parboil | spmv | 3 | 3 | 3 | 2 | 2 | 2 | 2 | 2 |
| | histo | 2 | 2 | 2 | 2 | 2 | 2 | 2 | 2 |
| | sad1 | 2 | 2 | 2 | 2 | 2 | 2 | 2 | 2 |
| | sad2 | 2 | 2 | 2 | 2 | 2 | 2 | 2 | 2 |
| | sad3 | 2 | 2 | 2 | 2 | 2 | 2 | 2 | 2 |
| | stencil | 4 | X | 6 | 3 | 4 | 5 | 3 | 3 |

| | | 6 × 6 | 7 × 7 | | | 8 × 8 | | |
|---|---|---|---|---|---|---|---|---|
| Suites | Loops | CRIM. | MII | RAMP | CRIM. | MII | RAMP | CRIM. |
| MiBench | bitcount | 3 | 3 | 3 | 3 | 3 | 3 | 3 |
| | susan | 2 | 2 | 2 | 2 | 2 | 2 | 2 |
| | sha | 2 | 2 | 2 | 3 | 2 | 2 | 4 |
| | jpeg1 | 2 | 2 | 2 | 2 | 2 | 2 | 2 |
| | jpeg2 | 2 | 2 | 2 | 2 | 2 | 2 | 2 |
| Rodinia | kmeans1 | 2 | 2 | 2 | 2 | 2 | 2 | 2 |
| | kmeans2 | 2 | 2 | 2 | 2 | 2 | 2 | 2 |
| | kmeans3 | 2 | 2 | 2 | 2 | 2 | 2 | 2 |
| | kmeans4 | 2 | 2 | 2 | 2 | 2 | 2 | 2 |
| | kmeans5 | 2 | 2 | 2 | 2 | 2 | 2 | 2 |
| | lud1 | 2 | 2 | 2 | 2 | 2 | 2 | 2 |
| | lud2 | 2 | 2 | 2 | 2 | 2 | 2 | 2 |
| | b + tree | 2 | 2 | 2 | 2 | 2 | 2 | 2 |
| | streamcluster | 2 | 2 | 2 | 2 | 2 | 2 | 2 |
| | nw | 2 | 2 | 2 | 2 | 2 | 2 | 2 |
| | BFS | 3 | 2 | 2 | 2 | 2 | 2 | 3 |
| | hotspot3D | 7 | 3 | X | 6 | 3 | X | 4 |
| | backprop | 3 | 3 | 3 | 3 | 3 | 3 | 4 |
| Parboil | spmv | 2 | 2 | 2 | 2 | 2 | 2 | 2 |
| | histo | 2 | 2 | 2 | 2 | 2 | 2 | 2 |
| | sad1 | 2 | 2 | 2 | 2 | 2 | 2 | 2 |
| | sad2 | 2 | 2 | 2 | 2 | 2 | 2 | 2 |
| | sad3 | 2 | 2 | 2 | 2 | 2 | 2 | 2 |
| | stencil | 3 | 3 | 3 | 4 | 2 | 2 | 2 |

From Table III, it can be inferred that for loops, jpeg1, jpeg2, hotspot3D, backprop, and stencil, IMS-based state-of-the-art heuristic RAMP, was not able to find a valid mapping for a 4×4 CGRA (failure to map denoted by "X" in Table III). From the motivating example in FIGS. 3A-3E, IMS produces almost the same modulo schedule time for most of the nodes for any increase in II. The system 100, on the other hand, facilitates the exploration of different modulo scheduling times for nodes of the DFG, resulting in a valid mapping. It is observed that even at a lower CGRA size 4×4, the system 100 was able to map these particular loops. From Table III, when running on RAMP, loops that were not mappable on a 4×4 CGRA were eventually mapped when allocated enough resources. For example, stencil which was unmappable by RAMP on a 4×4 CGRA was mapped on a 5×5 CGRA due to allocation of additional resources. Therefore it can be said that the motivating example can also be mapped when allocated enough resources. From the motivating example, if the CGRA architecture of FIG. 3B was a 3×3 CGRA, then the IMS-based mapping algorithm would have used the extra resources provided to route the operation r. But this conclusion was not applicable to all the loops, meaning, loops such as hotspot3D and jpeg2 were unable to find a valid mapping even when additional resources were allocated. RAMP was not able to achieve a mapping even at 8×8 CGRA for hotspot3D whereas RAMP was not able to achieve a mapping till 6×6 for jpeg2. While RAMP is able to map most of the loops at a higher CGRA size, the system 100 with effective randomized modulo scheduling was able to map all the loops at size 4×4. Additionally, for sad1 and sad3 loops, for which GraphMinor was not able to find a mapping, the system 100 was able to achieve a mapping at 4×4 CGRA size.

From Table III it can be observed that for loops mapped using RAMP, the II obtained from CRIMSON was comparable to RAMP across five different CGRA sizes ranging from 4×4 to 8×8. An occasional spike can be observed in the II in the system 100 for susan at 4×4 and stencil on 5×5, which is due to premature II increase by the system 100 based on the A value. To emphasize, A is the maximum number of randomized schedules that are explored at the same II. A new schedule may be requested (i) on a failure to find a randomized schedule, (ii) on a failure of the feasibility test or, (iii) a failure to map. The A value is not reset for a given II. After exhausting the A limit, the II is increased and a new RC ASAP and RC ALAP is computed along with a new A value. The A value is computed by Equation 1 for each II. The A value is determined by the user defined exploration factor, which is the percentage of schedule space to that should be explored. If the exploration factor is set too low, less modulo schedules are explored per II, thereby making it difficult to obtain a valid mapping and increasing the II prematurely. If the exploration factor is set too high, the time to obtain a valid schedule/mapping increases, which negatively affects the compilation time of the system 100. Table III comprehensively conveys that the system 100 has a nearly identical performance compared to RAMP for all the loops across different CGRA architectures that RAMP was able to map and the system 100 is better than RAMP by mapping the five loops that were not mappable by RAMP and seven loops that were not mappable by GraphMinor on a 4×4 CGRA. The II obtained from the system 100 is not always equal to or better than state-of-the-art RAMP and is dependent on the A value.

Scheduling Time Comparison Between CRIMSON and IMS

Figure 7:
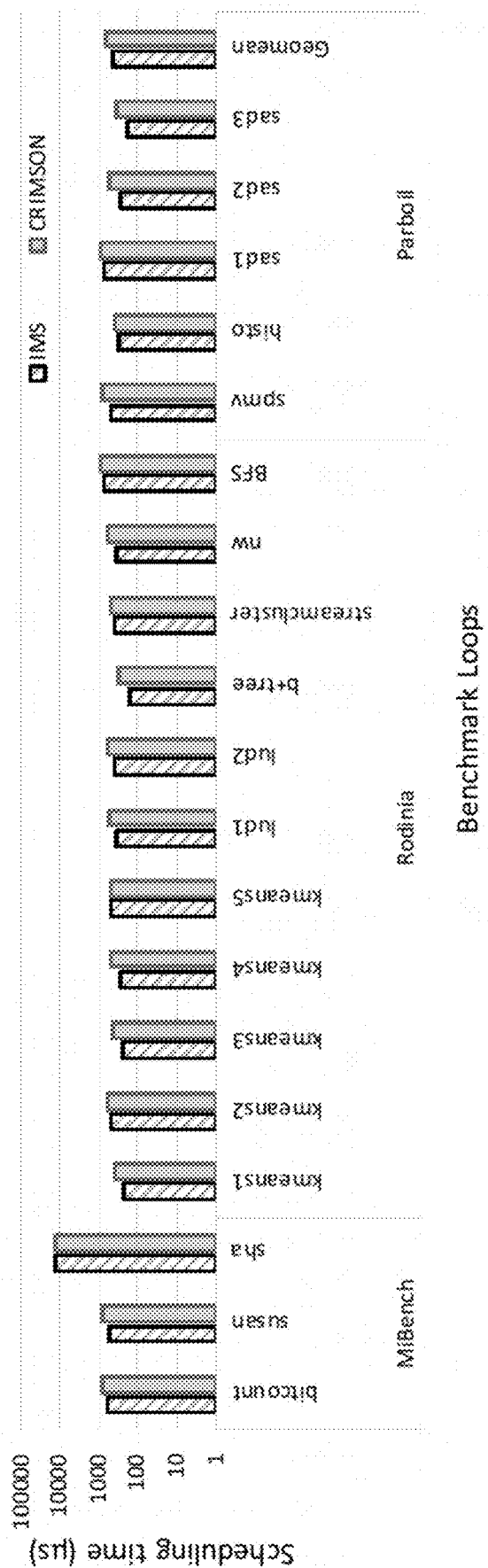
FIG. 7 is a graphical representation showing a scheduling time comparison of the system of FIG. 4 and a typical IMS system.

The scheduling time for IMS and the system 100 are shown in FIG. 7, which is reported based on the execution of both the algorithms on Intel-i7 running at 2.8 GHz with 16 GB memory. As shown in FIG. 7, the x-axis is the scheduling time i.e, time to obtain a valid schedule that is mappable, in μs (microseconds) and the y-axis corresponds to the benchmark loops. The 19 benchmarks shown in FIG. 7 are those in which a mappable schedule was obtained by IMS. From FIG. 7, it is shown that the scheduling time of CRIMSON is slightly higher than that of IMS. This is due to the additional computation of RC ASAP and RC ALAP, and the feasibility test. For the loops shown, the exploration factor was kept at 0.005.

Trade-Off Analysis Between Scheduling Time and II at Different a Values

Figure 8:
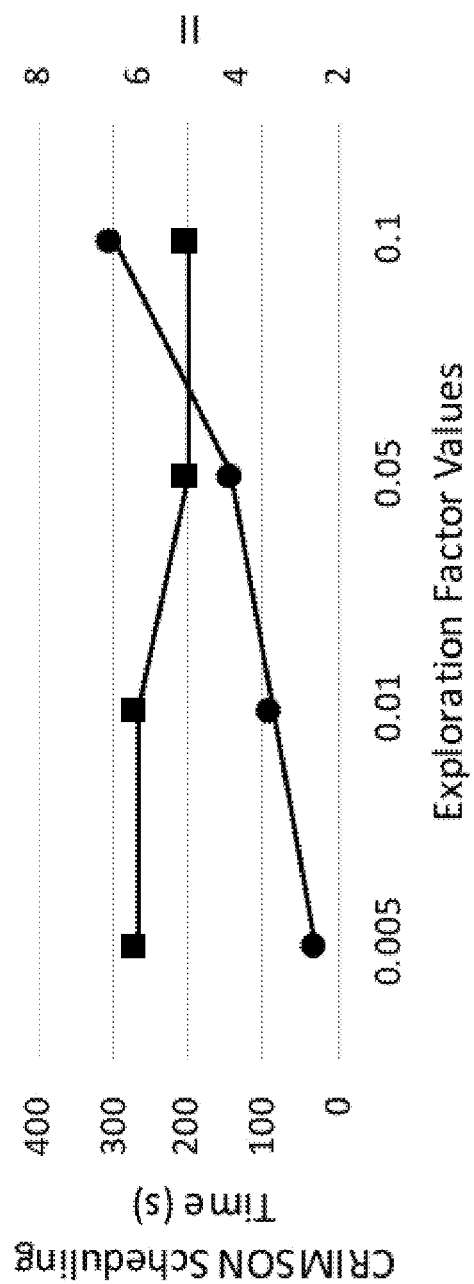
FIG. 8 is a graphical representation showing scheduling time of the system of FIG. 4 with respect to initiation interval trade-off for a specific application loop "stencil"
Figure 9:
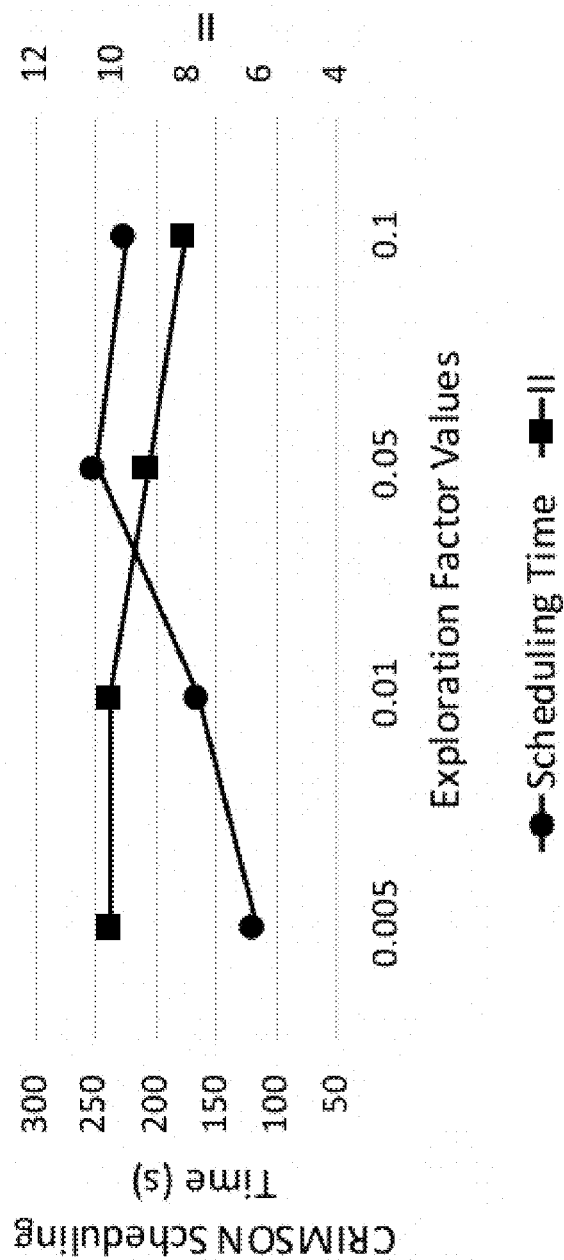
FIG. 9 is a graphical representation showing scheduling time of the system of FIG. 4 with respect to initiation interval trade-off for a specific application loop "hotspot3D"

From Equation 1, one can see that the A value depends on the exploration factor. This factor is defined as the percentage of modulo schedule space to be explored when there is an infeasible schedule or a mapping failure. The exploration factor was changed from 0.5% (0.005) to 10% (0.1) and the corresponding scheduling time and II were recorded. The scheduling time numbers are recorded from executing CRIMSON on Intel-i7 running at 2.8 GHz and 16 GB memory and the compilation was performed for a 4'4 CGRA. A 4'4 CGRA was chosen because the II obtained by CRIMSON was much greater than the MII and the effect of A can be shown clearly. In FIGS. 8 and 9, the left y-axis (primary axis) denotes the CRIMSON scheduling time, in seconds, and the right y-axis (secondary axis) denotes the II obtained. The x-axis denotes the different exploration factors. From Equation 1 it is to be noted that as the exploration factor increases, the λ value increases. From FIGS. 8 and 9, it is evident that as exploration factor increases the CRIMSON scheduling time increases, due to elaborate exploration of the schedule space at a given II. For lower value of the exploration factor, superficial exploration of modulo schedule space prematurely increases the II but at lower scheduling time. However, it can also be shown from FIGS. 8 and 9 at 0.1 that the above statement is not always true. At 0.1 the II decreases with the decrease in the scheduling time because a feasible and a mappable schedule was obtained earlier in the modulo schedule space exploration due to the innate randomness of the CRIMSON scheduling algorithm.

Computing System

Figure 4:
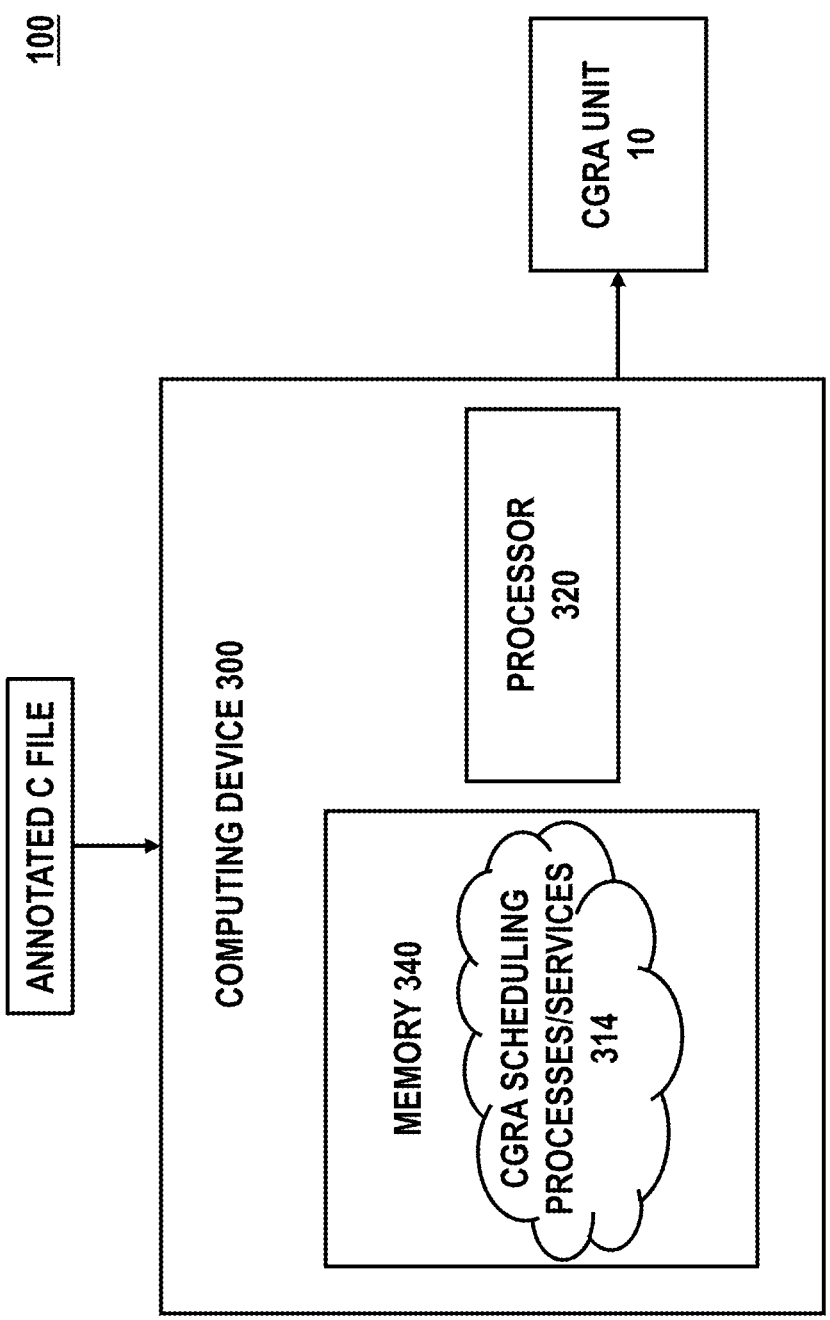
FIG. 4 is a simplified block diagram showing a system for scheduling and mapping of CGRAs.
Figure 10:
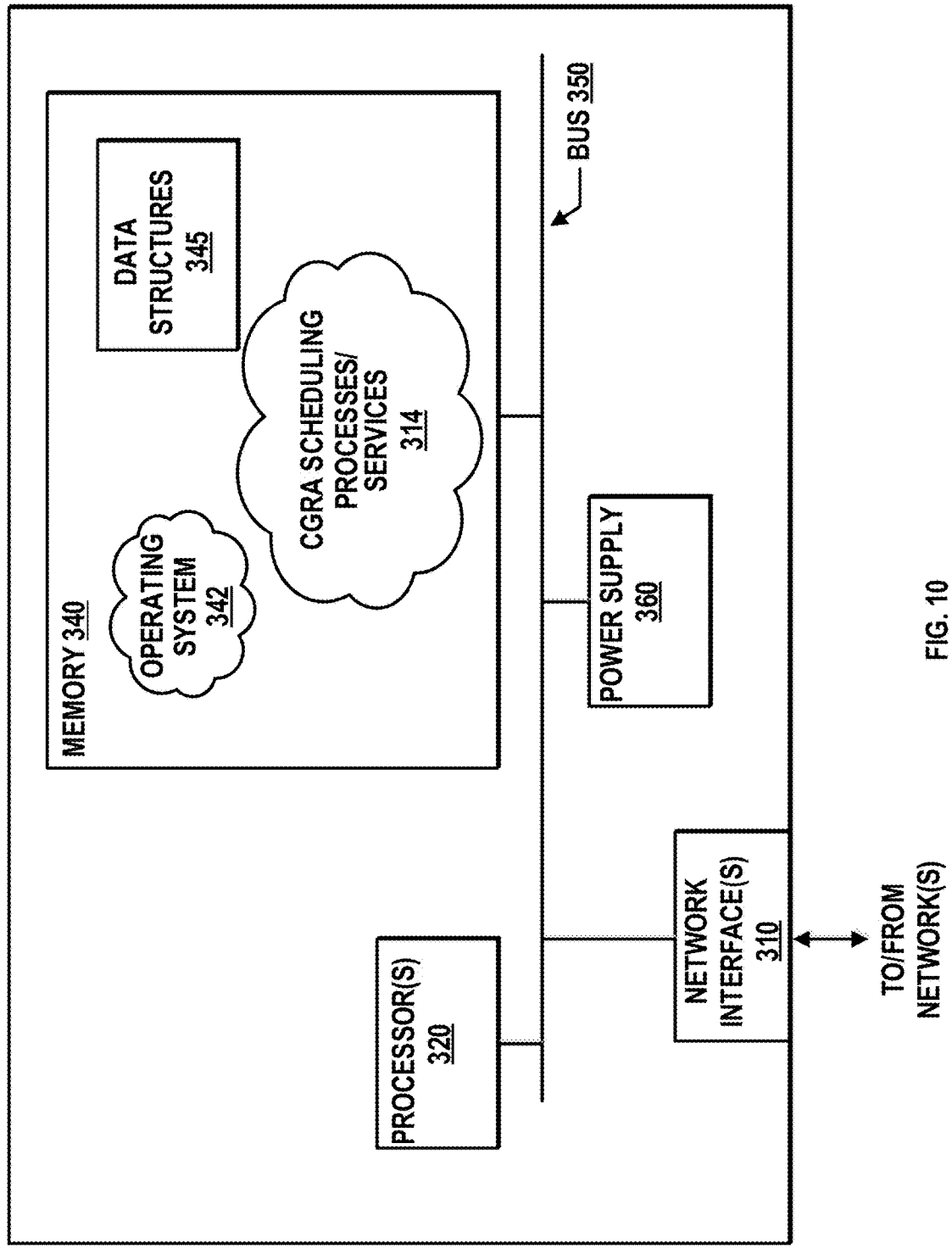
FIG. 10 is a simplified diagram showing an example computing system for implementation of the system of FIG. 4.

FIG. 10 is a schematic block diagram of an example device 300 that may be used with one or more embodiments described herein, e.g., as a component of system 100 and/or as computing device 300 shown in FIG. 4.

Device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes device 300 by, inter alia, invoking operations in support of software processes and/or services executing on the device. These software processes and/or services may include CGRA scheduling processes/services 314 described herein. Note that while CGRA scheduling processes/services 314 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the CGRA scheduling processes/services 314 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
a processor in communication with a memory and a coarse-grained reconfigurable architecture (CGRA) unit, the memory including instructions, which when executed, cause the processor to:
generate a data flow graph expressive of a computational loop configured for execution on the CGRA unit, wherein the data flow graph includes a plurality of nodes;
determine an upper bound modulo timeslot for each node in the data flow graph, the upper bound modulo timeslot being representative of an upper scheduling bound of a CGRA schedule for each node of the plurality of nodes; and
iteratively generate a random schedule for population within the CGRA schedule that schedules each node of the data flow graph to a random timeslot between a lower bound modulo timeslot and the upper bound modulo timeslot of the CGRA schedule with respect to an initiation interval value.

2. The system of claim 1, wherein the memory further includes instructions, which, when executed, cause the processor to:
map the CGRA schedule onto the CGRA unit, the CGRA schedule including the random schedule.

3. The system of claim 1, wherein the step of generating a random schedule that schedules each node of the data flow graph to a random modulo timeslot further comprises:
schedule a node indicative of a current schedule operation of the plurality of nodes of the data flow graph at a randomly selected modulo timeslot between the lower bound modulo timeslot and the upper bound modulo timeslot;
consecutively displace one or more nodes that have resource conflicts with the node;
update the lower bound modulo timeslot and the upper bound modulo timeslot for the node based on the current schedule operation;
displace one or more previously-scheduled nodes having dependence conflicts with the node; and
add one or more displaced nodes to a queue of unscheduled nodes.

4. The system of claim 1, wherein the memory includes instructions, which when executed, further cause the processor to:
evaluate a feasibility of the random schedule with respect to resource usage of the random schedule as populated within the CGRA schedule; and
generate a new random schedule with the same initiation interval if the random schedule is evaluated to be infeasible.

5. The system of claim 4, wherein the step of evaluating feasibility of the random schedule includes:
estimate resource usage considering path sharing for each of a plurality of routing resources of the CGRA unit;
confirm that resource overuse does not occur in each modulo timeslot of the CGRA schedule according to a Modulo Resource Table; and
confirm that a total number of unique nodes including the routing nodes scheduled within a modulo timeslot of the plurality of modulo timeslots of the CGRA schedule is less than or equal to a number of processing elements of the CGRA unit scheduled within the modulo timeslot.

6. The system of claim 4, wherein the memory includes instructions, which when executed, further cause the processor to:
increase the initiation interval after $\lambda$ random schedules have been generated for a current value of the initiation interval.

7. The system of claim 1, wherein the upper bound modulo timeslot for each node of the plurality of nodes of the data flow graph is determined by identifying a Resource-Constrained As Late As Possible timeslot through a bottom-up depth-first search approach starting from nodes of the plurality of nodes that do not have any outgoing edges.

8. The system of claim 1, wherein the memory includes instructions, which when executed, further cause the processor to:
determine the lower bound modulo timeslot for each node of the plurality of nodes of the data flow graph by identifying a Resource-Constrained As Soon As Possible timeslot through a top-down, depth-first search approach starting from nodes of the plurality of nodes that do not have any incoming edges.

9. A method, comprising:
generating, by a processor, a data flow graph expressive of a computational loop configured for execution on the CGRA unit, wherein the data flow graph includes a plurality of nodes;
determining an upper bound modulo timeslot for each node in the data flow graph, the upper bound modulo timeslot being representative of an upper scheduling bound of a CGRA schedule for each node of the plurality of nodes; and
iteratively generating a random schedule for population within the CGRA schedule that schedules each node of the data flow graph to a random timeslot between a lower bound modulo timeslot and the upper bound modulo timeslot of the CGRA schedule with respect to an initiation interval value.

10. The method of claim 9, further comprising:
mapping the CGRA schedule onto the CGRA unit, the CGRA schedule including the random schedule.

11. The method of claim 9, wherein the step of generating a random schedule that schedules each node of the data flow graph to a random modulo timeslot further comprises:
scheduling a node of the plurality of nodes of the data flow graph at a randomly selected modulo timeslot between the lower bound modulo timeslot and the upper bound modulo timeslot;
consecutively displacing one or more nodes that have resource conflicts with a current schedule operation;
updating the lower bound modulo timeslot and the upper bound modulo timeslot for the node based on the current schedule operation;
displacing one or more previously-scheduled nodes having dependence conflicts with the current schedule operation; and
adding one or more displaced nodes to a queue of unscheduled nodes.

12. The method of claim 9, further comprising:
evaluating a feasibility of the random schedule with respect to resource usage of the random schedule as populated within the CGRA schedule; and
generating a new random schedule with the same initiation interval if the random schedule is evaluated to be infeasible.

13. The method of claim 12, wherein the step of evaluating feasibility of the random schedule comprises:
confirming that a total number of unique nodes including one or more routing nodes scheduled within a modulo timeslot of a plurality of modulo timeslots of the CGRA schedule is less than or equal to a number of processing elements of the CGRA unit scheduled within the modulo timeslot.

14. The method of claim 12, further comprising:
increasing the initiation interval after A random schedules have been generated for a current value of the initiation interval.

15. The method of claim 9, wherein the upper bound modulo timeslot for each node of the plurality of nodes of the data flow graph is determined by identifying a Resource-Constrained As Late As Possible timeslot through a bottom-up depth-first search approach starting from nodes of the plurality of nodes that do not have any outgoing edges.

16. The method of claim 9, further comprising:
determining the lower bound modulo timeslot for each node of the plurality of nodes of the data flow graph by identifying a Resource-Constrained As Soon As Possible timeslot through a top-down, depth-first search approach starting from nodes of the plurality of nodes that do not have any incoming edges.

17. A method, comprising:
generating a random schedule for mapping onto a coarse-grained reconfigurable architecture (CGRA) unit that schedules a node of a plurality of nodes of a data flow graph expressive of an operation of a computational loop to a random timeslot between a lower bound modulo timeslot and an upper bound modulo timeslot with respect to an initiation interval value;
evaluating a feasibility of the random schedule with respect to resource usage;
generating a new random schedule upon infeasible evaluation of the random schedule; and
increasing the initiation interval after A random schedules have been generated for a current value of the initiation interval.

18. The method of claim 17, further comprising:
mapping the random schedule onto the CGRA unit upon feasible evaluation of the random schedule.

19. The method of claim 17, wherein the step of evaluating feasibility of the random schedule comprises:
confirming that a total number of unique nodes including one or more routing nodes scheduled within a modulo timeslot of a plurality of modulo timeslots of the random schedule is less than or equal to a number of processing elements of the CGRA unit scheduled within the modulo timeslot.

20. The method of claim 19, wherein the step of generating a random schedule further comprises:
scheduling a node of the plurality of nodes at a randomly selected modulo timeslot between the lower bound modulo timeslot and the upper bound modulo timeslot;
consecutively displacing one or more nodes that have resource conflicts with a current schedule operation;
updating the lower bound modulo timeslot and the upper bound modulo timeslot for the node based on the current schedule operation;
displacing one or more previously-scheduled nodes having dependence conflicts with the current schedule operation; and
adding one or more displaced nodes to a queue of unscheduled nodes.

* * * * *